(12) United States Patent
Kitaoka

(10) Patent No.: US 7,227,744 B2
(45) Date of Patent: Jun. 5, 2007

(54) DATA RECORDING DEVICE AND MEMORY CARTRIDGE OF DATA RECORDING DEVICE

(75) Inventor: Yasuhide Kitaoka, Saitama (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 10/831,777

(22) Filed: Apr. 23, 2004

(65) Prior Publication Data

US 2004/0223294 A1 Nov. 11, 2004

(30) Foreign Application Priority Data

| Apr. 25, 2003 | (JP) | 2003-122140 |
| Apr. 25, 2003 | (JP) | 2003-122166 |
| Apr. 25, 2003 | (JP) | 2003-122185 |
| Apr. 25, 2003 | (JP) | 2003-122234 |

(51) Int. Cl.
*H05K 5/00* (2006.01)
*G11B 17/04* (2006.01)
*A47B 88/00* (2006.01)

(52) U.S. Cl. ............ 361/684; 361/679; 361/685; 361/754; 360/99.06; 312/332.1

(58) Field of Classification Search ........ 361/679–687, 361/724–727, 754; 292/23, 15, 75, 79, 73; 439/152–160; 360/99.06
See application file for complete search history.

(56) References Cited

U.S. PATENT DOCUMENTS

| 5,126,890 | A | * | 6/1992 | Wade et al. ............. 360/60 |
| 5,684,671 | A | * | 11/1997 | Hobbs et al. ............. 361/683 |
| 6,067,225 | A | * | 5/2000 | Reznikov et al. ........... 361/685 |
| 6,088,221 | A | * | 7/2000 | Bolognia ............. 361/685 |
| 6,205,419 | B1 | * | 3/2001 | Fiedler ............. 704/201 |
| 6,224,391 | B1 | * | 5/2001 | Horie et al. ............. 439/64 |
| 6,288,902 | B1 | * | 9/2001 | Kim et al. ............. 361/725 |
| 6,529,374 | B2 | | 3/2003 | Yamashita et al. |
| 6,699,128 | B1 | * | 3/2004 | Beadell et al. ............. 463/46 |
| 2002/0078297 | A1 | * | 6/2002 | Toyama et al. ............. 711/115 |

* cited by examiner

*Primary Examiner*—Lisa Lea-Edmonds
*Assistant Examiner*—Zachary Pape
(74) *Attorney, Agent, or Firm*—Weingarten, Schurgin, Gagnebin & Lebovici LLP

(57) ABSTRACT

A data recording device and a memory cartridge of a data recording device that improve the manipulation of attaching and detaching the memory cartridge and the portability of the memory cartridge. The data recording device (A) is replaceably equipped with a memory cartridge (B) accommodating a memory card (DM) as a data recording medium. The memory cartridge (B) includes a handle (23) capable of being popped out.

5 Claims, 23 Drawing Sheets

Fig. 11
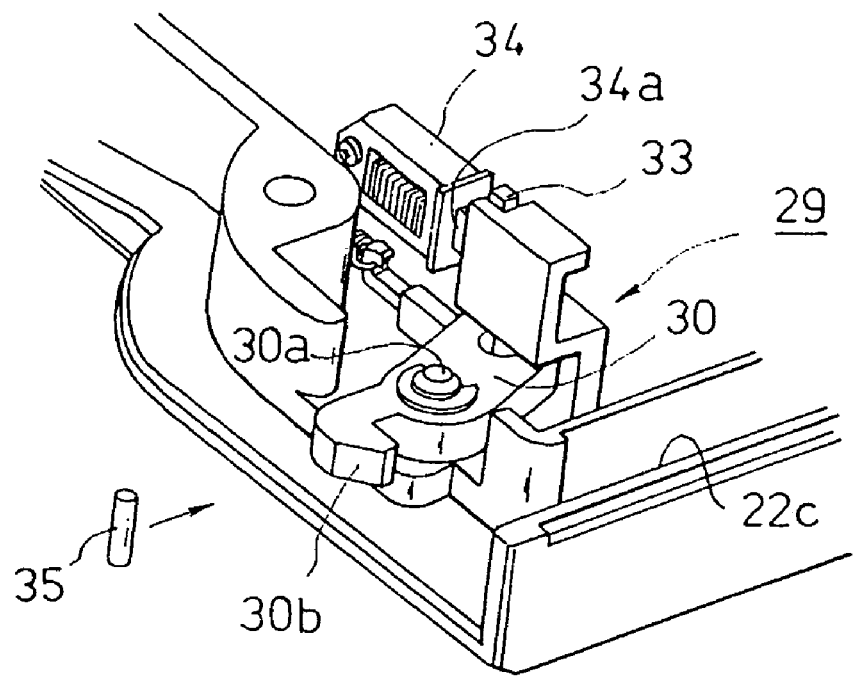
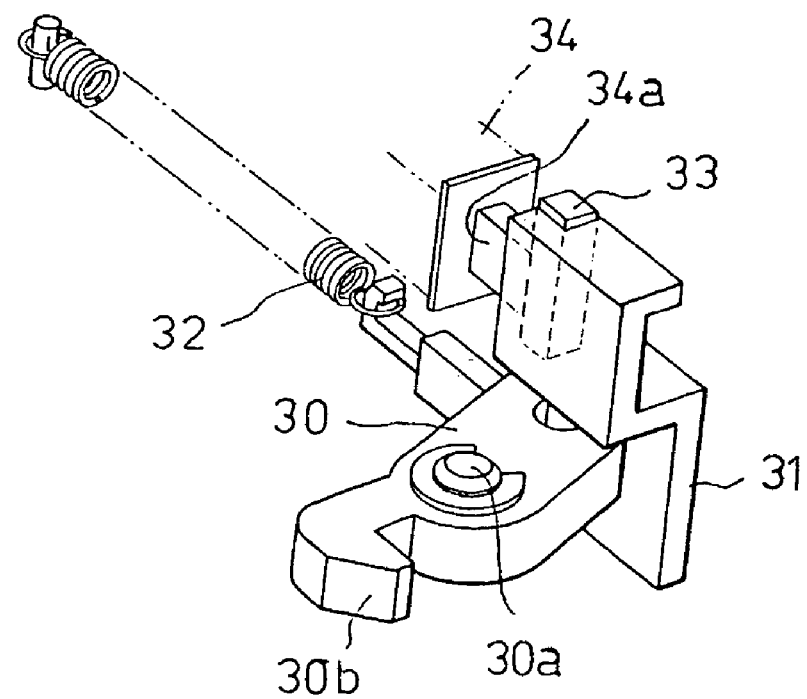

DATA RECORDING DEVICE AND MEMORY CARTRIDGE OF DATA RECORDING DEVICE

This application claims priority to the following four applications:

Japanese application No. 2003-122140 filed Apr. 25, 2003;

Japanese application No. 2003-122166 filed Apr. 25, 2003;

Japanese application No. 2003-122185 filed Apr. 25, 2003;

and Japanese application No. 2003-122234 filed Apr. 25, 2003.

BACKGROUND OF THE INVENTION

1. Field of the Invention

The present invention relates to a data recording device that accommodates memory cards that are data recording media to thus constitute a memory cartridge and is loaded with and integrated with the memory cartridge, the data recording device for recording image information generated as digital signals in the memory cards of the memory cartridge.

2. Description of the Related Art

Data recording devices using magnetic tapes as data recording media have been developed as flight recorders (airborne video tape recorders (AVTR)) mounted in airplanes. However, since higher reliability is requested, memory cards (PCMCIA cards) that adopt semiconductor memory elements are being used. In order to solve problems caused by the generation of heat inside the sealed case of the data recording device, to and from which a memory cartridge as a single body composed of a plurality of accommodated memory cards can be attached and detached, the applicant of the present application tries to take measures (for example, the Patent Document 1).

[Patent Document 1]
U.S. Pat. No. 6,529,374 B2

SUMMARY OF THE INVENTION

The patent document 1 discloses a widely used improved technology capable of solving problems caused by the generation of heat in an electronic apparatus whose case is sealed. The technology is essential to the data recording device according to the present invention. Although basic problems such as the generation of heat were solved, problems in convenience of use or safety measures for protecting data are to be solved.

That is, for example, in the case of the structure disclosed in the conventional patent document 1, when the memory cartridge is mounted in a main body, since the entire memory cartridge is connected to a connector while being buried in the main body, it is difficult to take the memory cartridge out. Since the memory cartridge is not forcibly supported in a state where the data recording device is driven, the memory cartridge may be disconnected from the connector or the connection state may deteriorate. Since the data recording device according to the present invention has the function of a computer, when the memory cartridge is taken out from the main body, in order to protect the data recorded in the memory cards of the memory cartridge, it is necessary to take the safety measures of taking the memory cartridge after shutting down the computer. Therefore, in order to solve the problems of the data recording device to and from which the memory cartridge can be attached and detached, it is an object of the present invention to improve the manipulation property of attaching and detaching the memory cartridge and the portability of the memory cartridge To achieve this object, in one aspect of the claimed invention, there is provided a memory cartridge of a data recording device replaceably equipped with the memory cartridge accommodating a memory card as a data recording medium, wherein the memory cartridge comprises a handle capable of being popped out. According to another aspect of the claimed invention, there is provided a memory cartridge of a data recording device replaceably equipped with the memory cartridge accommodating a memory card as a data recording medium, wherein the memory cartridge comprises a handle capable of being popped out, and wherein, in a state where the memory cartridge is taken out from the data recording device to thus be a single body, the handle can be accommodated in and fixed to the main body of the memory cartridge. According to still another aspect of the claimed invention, there is provided a memory cartridge of a data recording device replaceably equipped with the memory cartridge accommodating a memory card as a data recording medium, wherein the memory cartridge comprises a handle capable of being popped out, and an eject/lock mechanism capable of controlling the handle from the main body of data recording device. According to yet another aspect of the claimed invention, there is provided a data recording device replaceably equipped with a memory cartridge accommodating a memory card as a data recording medium, wherein the memory cartridge comprises a handle capable of being popped out and an eject/lock mechanism capable of controlling the handle from the main body of data recording device, and wherein the handle of the memory cartridge is popped out by releasing the locking state of the eject/lock mechanism by synchronizing with shut-down completion of the data recording device. According to still yet another aspect of the claimed invention, there is provided a data recording device replaceably equipped with a memory cartridge accommodating a memory card as a data recording medium, wherein the memory cartridge comprises a handle capable of being popped out, and wherein an open-close door is provided in a memory cartridge accommodating portion for the data recording device, and a pressing member serving for accommodating the handle of the memory cartridge is provided in the open-close door. According to a further aspect of the claimed invention, there is provided a data recording device wherein the pressing member is equipped with a rotatable pressing roller, and when the open-close door is closed, the memory cartridge is pressed by spring pressure of pressing roller in the loaded direction.

BRIEF DESCRIPTION OF THE DRAWINGS

FIG. 11 is a perspective view illustrating an eject/lock mechanism;

DESCRIPTION OF THE PREFERRED EMBODIMENT

Preferred embodiments of the present invention will now be described with reference to the drawings. Also, since the present invention is completed by assembling a plurality of components, in order to facilitate appreciation thereof, the entire structure will be schematically described.

Figure 1:
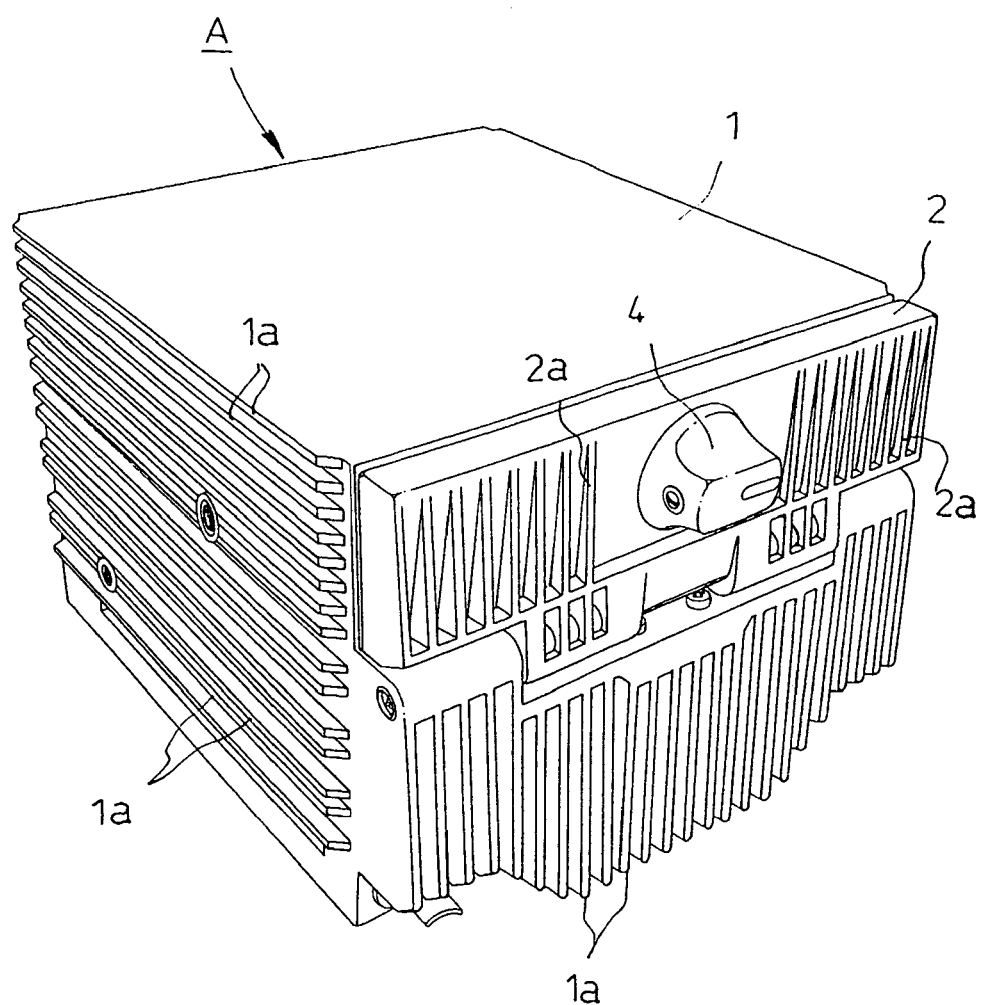
FIG. 1 is a perspective view illustrating the external appearance of a data recording device according to the present invention.
Figure 2:
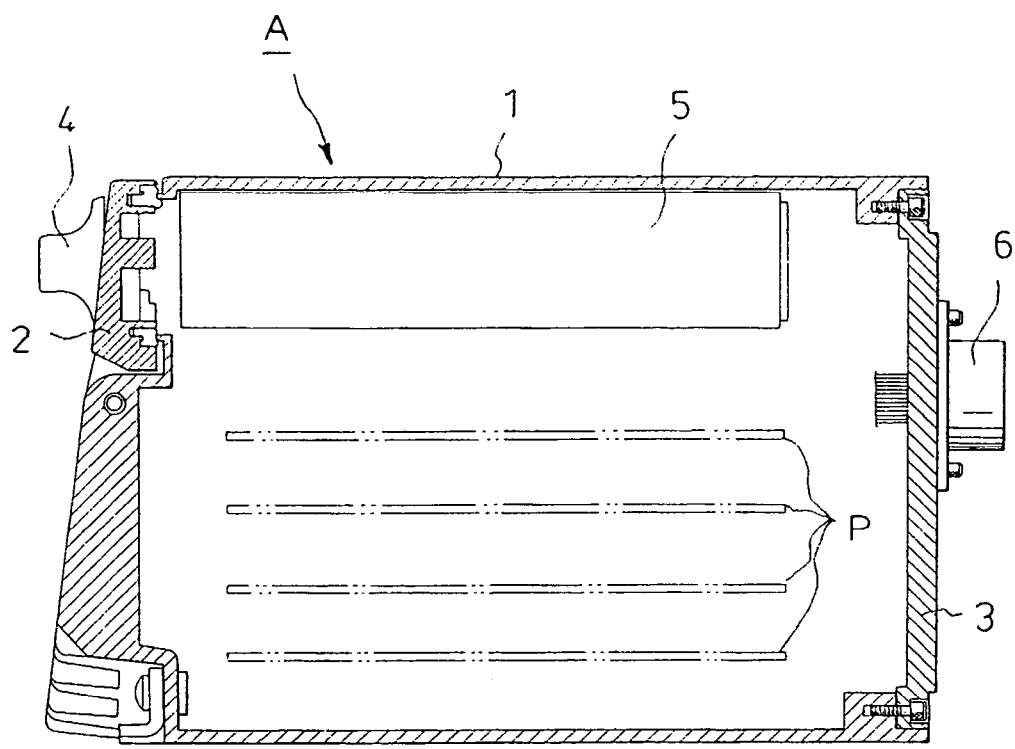
FIG. 2 is a sectional view illustrating the internal structure of FIG. 1.

FIG. 1 is a perspective view illustrating the completion state of a data recording device A according to the present invention. The present invention is mainly composed of the data recording device A and a memory cartridge B illustrated in FIG. 3, which can be attached to and detached from the data recording device A. The main body 1 of the data recording device A is integrally molded by aluminum die casting so that only the parts in which a open-close door 2 and a rear surface panel 3 are provided on the upper portion of the front surface are opened as illustrated in FIG. 2. As noted from FIG. 2, when the open-close door 2 and the rear surface panel 3 are mounted, the inside of the case of the data recording device A is sealed so that the generated heat of electronic parts is accumulated. Therefore, in order to radiate the generated heat inside the case of the data recording device A, radiation fins 1a and 2a are formed in the side and in the lower portion of the front surface of the main body 1 and in the front surface of the open-close door 2.

A door knob 4 is provided in the center of the open-close door 2. The manipulation of the door knob 4 is transmitted to the rear surface of the open-close door 2 by a knob rod 4a. FIG. 2 schematically illustrates the internal structure of the main body 1. A memory cartridge holder 5 for accommodating the memory cartridge B is provided in the rear portion of the open-close door 2. A plurality of substrate boards P on which electronic parts for constituting an electronic circuit component such as an input and output interface and a computer are mounted are provided in the lower portion of the memory cartridge holder 5. A rear surface panel 3 molded by the aluminum die casting is provided in the aperture of the rear surface of the main body 1. A connector 6 for external wiring lines is provided in the rear surface panel 3.

Figure 4:
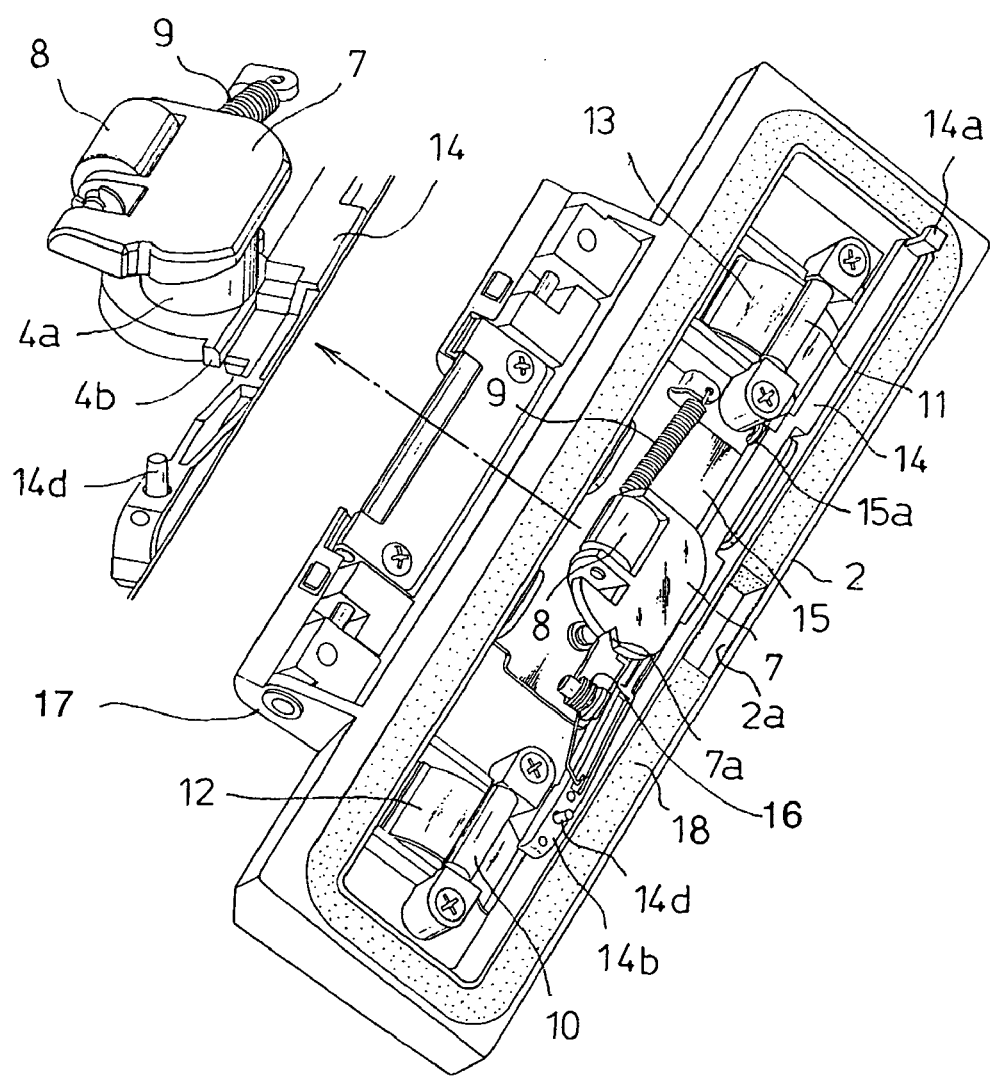
FIG. 4 is a perspective view illustrating the structure of an open-close door.

FIG. 4 illustrates the structure of the rear surface of the open-close door 2. A latch plate 7 for latching the open-close door 2 to the main body 1 is fixed to the end of the other side of the knob rod 4a for fixing the door knob 4. A pressing roller 8 is rotatably mounted in the end of the latch plate 7. A locking groove 7a locked to the following latch mechanism is provided on the side of the latch plate 7. The knob rod 4a of the latch plate 7 is elastically supported by a tension coil spring 9 in the direction where the open-close door 2 is unlatched from the main body 1. When the open-close door 2 is opened, as illustrated in FIG. 4, the right position of the knob rod 4a is maintained. Pressing rollers 10 and 11 that are elastically supported by plate springs 12 and 13 are rotatably provided on both sides of the other side of the open-close door 2. As mentioned later, the loaded memory cartridge B is pressed by the pressing rollers 10 and 11.

Figure 5:
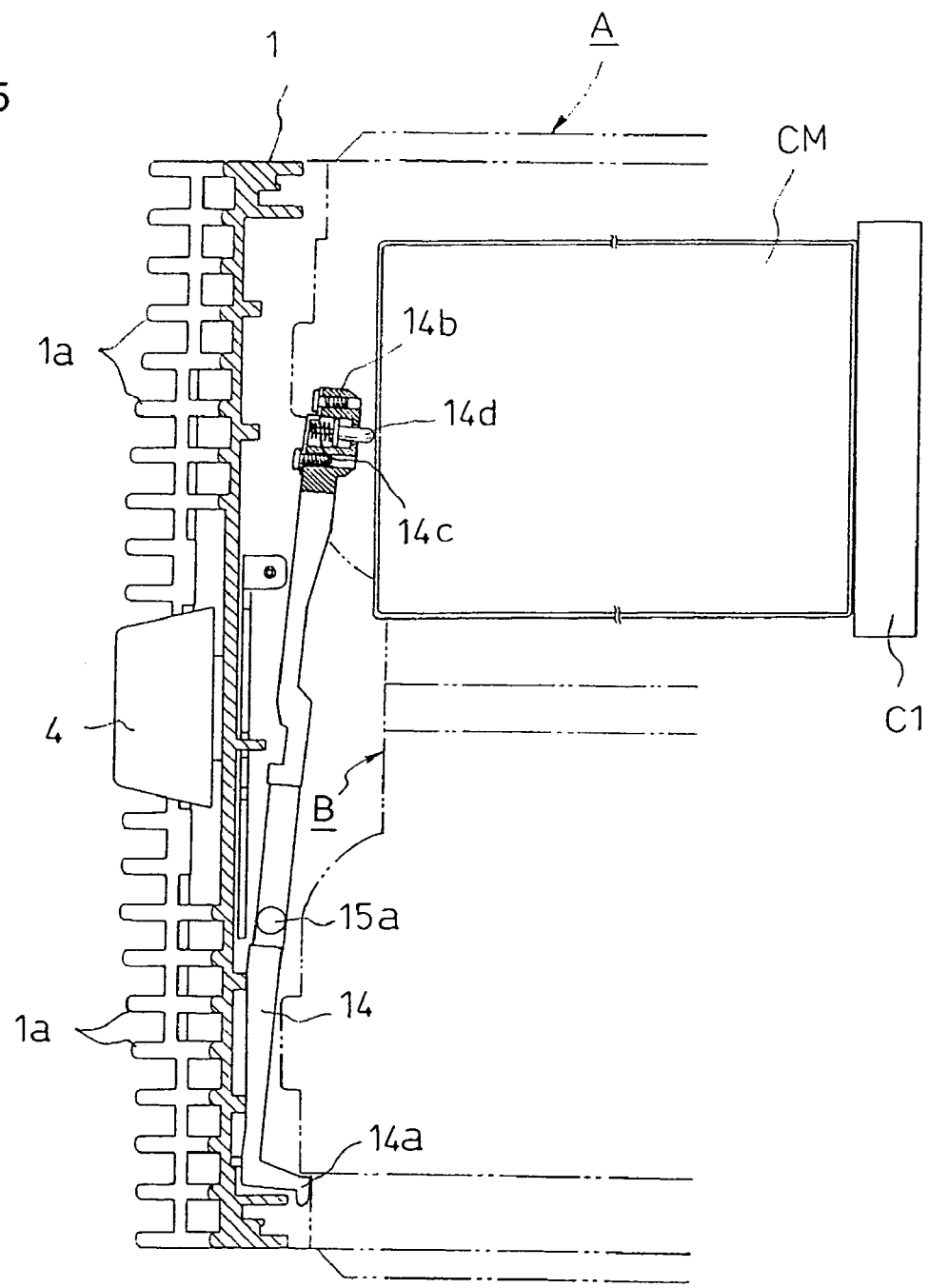
FIG. 5 is a view illustrating a state in which a memory card is fixed.

Reference numeral 14 denotes a seesaw lever rotatably supported 15a to the upstanding part of a base plate 15 fixed to the bottom surface of the open-close door 2 so as to swing. When the open-close door 2 is latched to the main body 1 as illustrated in FIG. 5, in the seesaw lever 14, a manipulation end 14a is pressed on the side wall of the main body 1 and an operation end 14b swings so that the rear end of the memory card CM that stores the later-mentioned system control program is pressed by a pressing pin 14d elastically supported by a compression coil spring 14c built in the leading end of the seesaw lever 14 to thus prevent the memory card CM from being detached from a multi-connector C1. When the open-close door 2 is unlatched from the main body 1, the seesaw lever 14 is returned to the right position by the operation of a twist coil spring 16 so that the protrusion 4b of the knob rod 4a contact the seesaw lever 14 as illustrated in FIG. 4. Therefore, the rotation of the knob rod 4a is prevented so that the door knob 4 does not unnecessarily rotate.

The open-close door 2 having the above structure is fixed to the main body 1 by a hinge mechanism 17. However, when the open-close door 2 is unlatched from the main body 1, it is possible to prevent the open-close door 2 from swinging by itself and to thus fix the open-close door 2 to the right position by using a toggle spring structure for the hinge mechanism 17. A concave groove 2a is formed in the outer circumference of the inside of the open-close door 2. A packing 18 made of a material having air tightness and water tightness and preventing static electricity and electromagnetic waves from entering is buried in the concave groove 2a.

Figure 6:
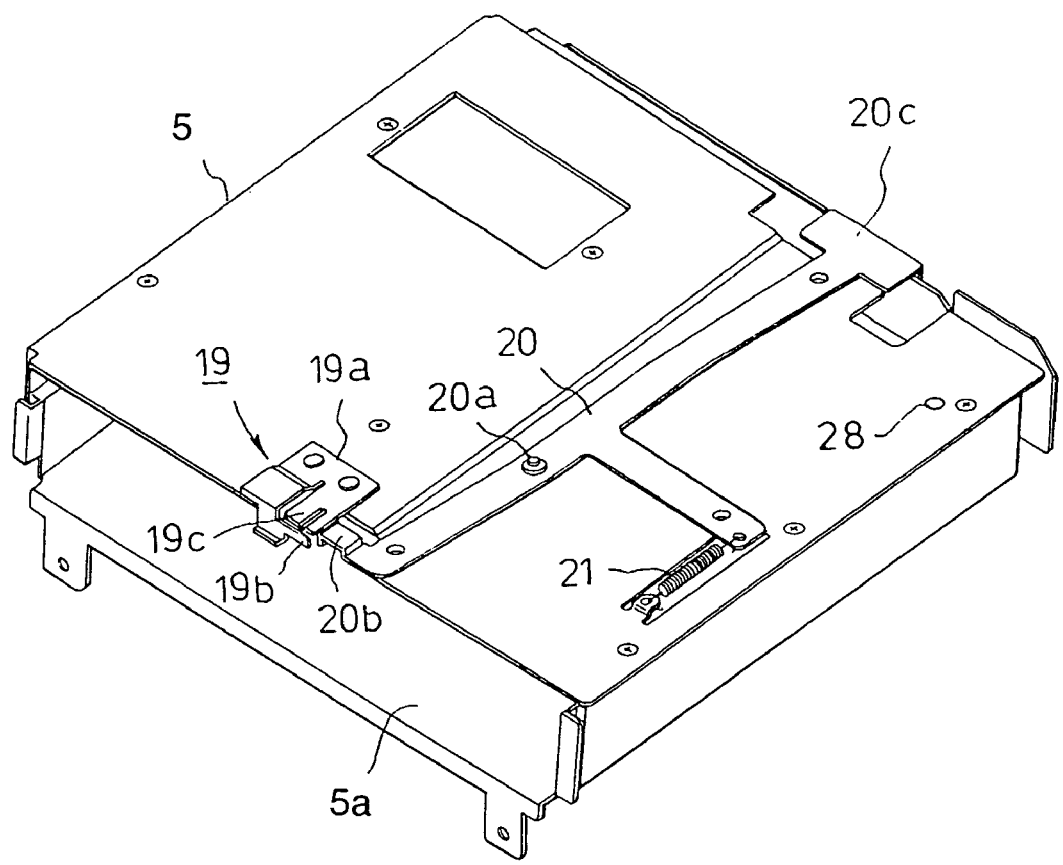
FIG. 6 is a perspective view illustrating the structure of a memory cartridge holder.
Figure 7:
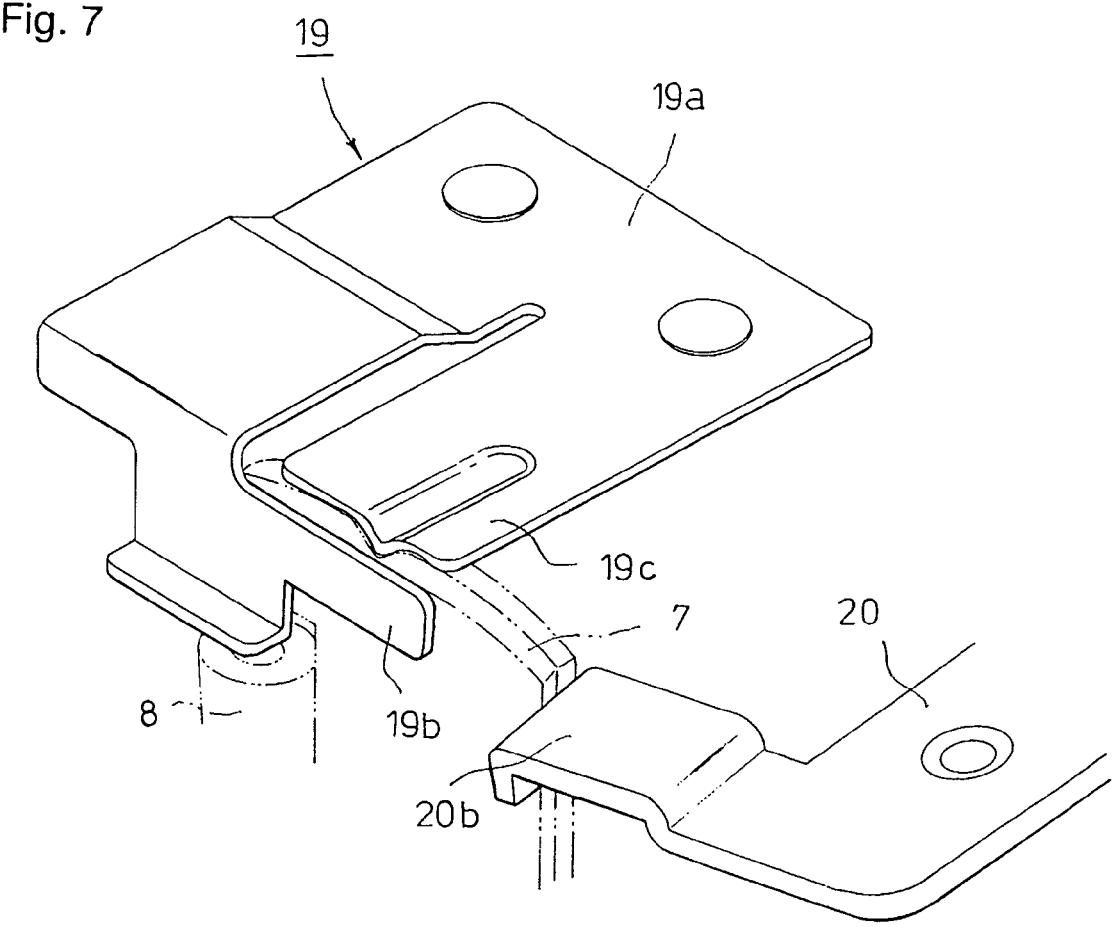
FIG. 7 is a perspective view illustrating a mechanism for latching the open-close door.

FIG. 6 is a perspective view illustrating the external appearance of the memory cartridge holder 5 for accommodating the memory cartridge B. An aperture 5a is formed in the front end and a latch mechanism 19 is provided in the center of the top plate that contacts the aperture 5a. As illustrated in FIG. 7, the latch mechanism 19 is formed by bending one plate spring. A main body 19a is fixed to the top plate of the memory cartridge holder 5 by appropriate means such as welding. An elastic piece 19b and a locking piece 19c are formed in the free end of the plate spring. Therefore, when the door knob 4 is rotated in order to latch the open-close door 2 to the main body 1, the latch plate 7 sliding contacts the elastic piece 19b so that the open-close door stops in the right position by sliding contact friction greater than the tension of the tension coil spring 9. The locking piece 19c is formed to generate a click sense by locking the protrusion to the locking groove 7a of the latch plate 7 so that the door knob 4 is correctly manipulated.

On the other hand, a switch lever 20 elastically supported by a tension coil spring 21 is provided in the top plate of the memory cartridge holder 5 so as to swing about a support point 20a. Therefore, as illustrated in FIG. 7, when the latch plate 7 approaches the latch mechanism 19, the side end of the latch plate 7 presses the leading end 20b of the switch lever 20. Therefore, a rear end 20c swings to thus operate the switch provided in the rear surface of the memory cartridge holder 5. Therefore, an electric signal for sensing that the open-close door 2 is latched to the main body 1 is obtained and is transmitted to a control circuit.

Figure 3:
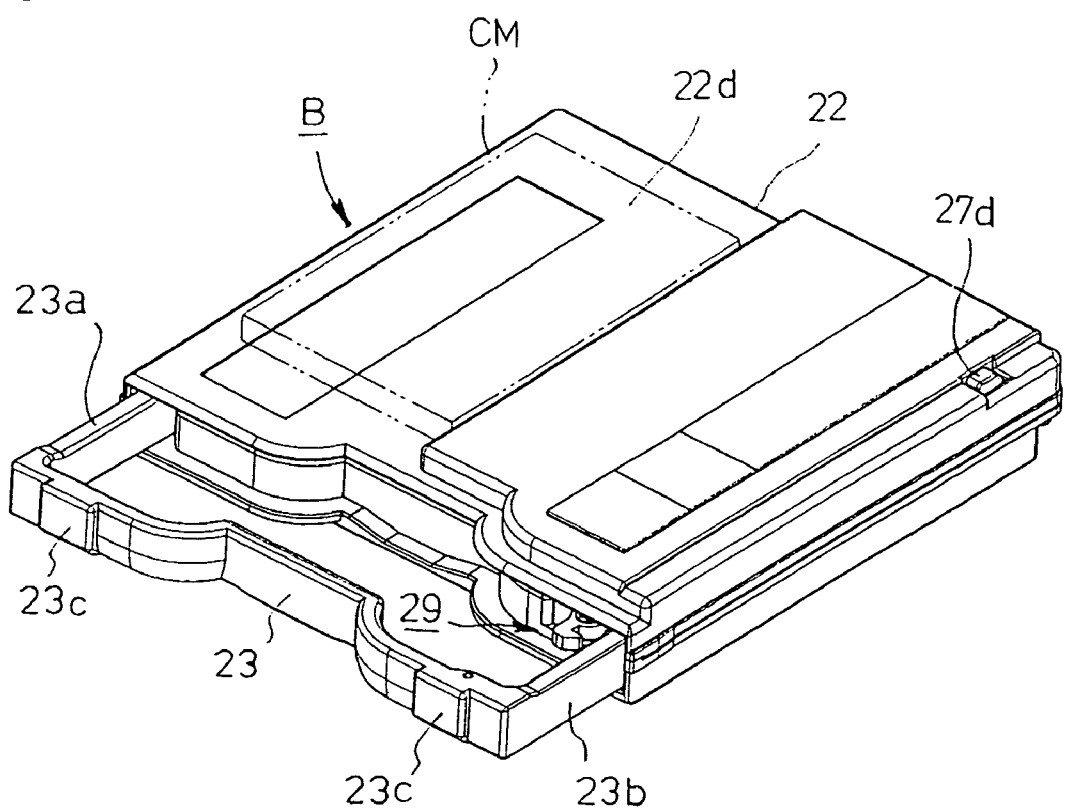
FIG. 3 is a perspective view illustrating the external appearance of a memory cartridge according to the present invention.
Figure 8:
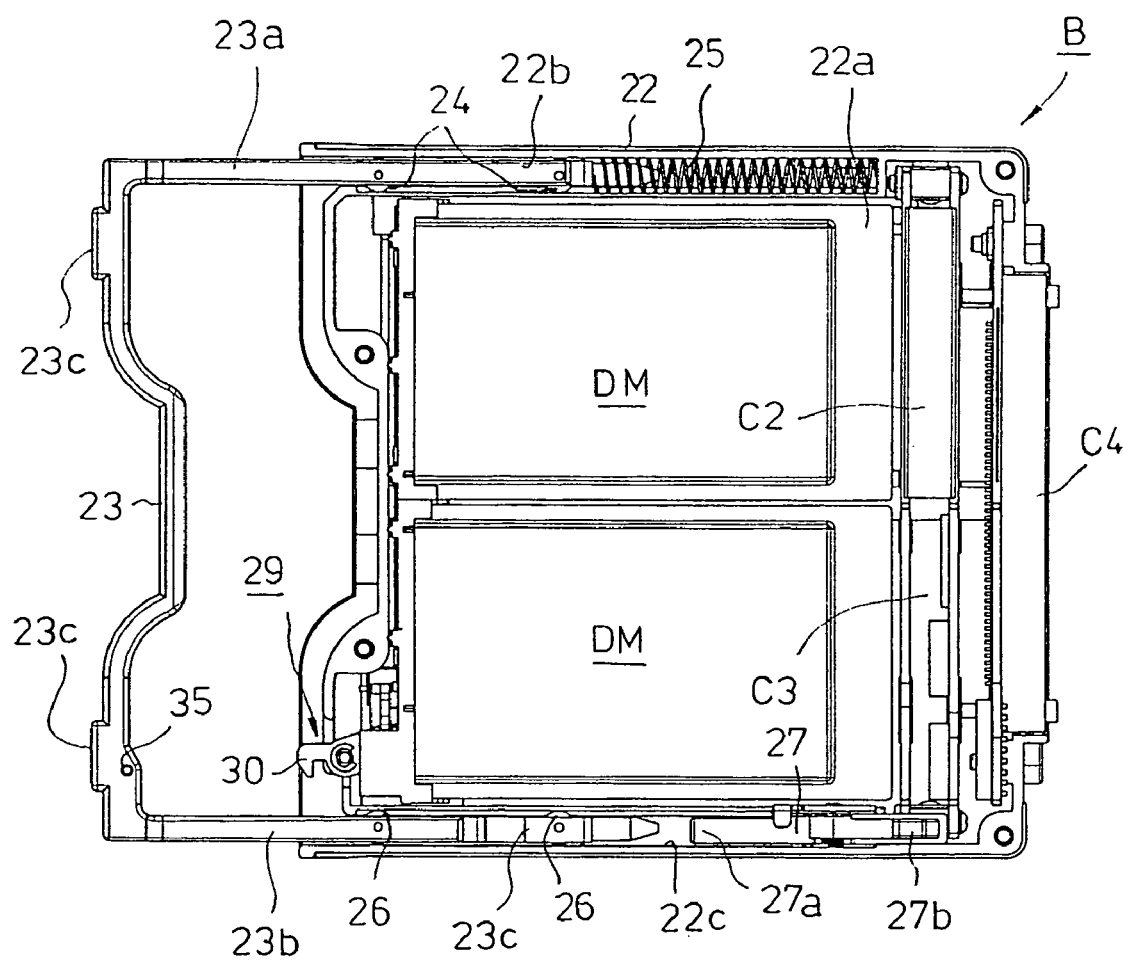
FIG. 8 is a view illustrating the internal structure of the memory cartridge.

The memory cartridge B to be loaded in the main body 1 has the external appearance illustrated in FIG. 3. A case-shaped main body 22 is molded by the aluminum die casting. In order to accommodate the plurality of memory cards DM using semiconductor memory elements as data recording media as illustrated in FIG. 8, a hollow portion 22a is formed in the main body 22. The number of memory cards DM varies in accordance with how the entire memory capacity is set. However, according to the present embodiment, seven memory cards can be accommodated. When the memory capacity of one memory card is 1.2 GB (gigabyte), the entire memory capacity is 8.4 GB by a simple calculation. The memory cards DM are connected to multi-connectors C2 and C3 and can be connected to the data recording device A by a multi-connector C4.

Therefore, as illustrated in FIG. 8, when the memory cards DM are arranged in parallel in the main body 22, the number of memory cards DM accommodated in one direction is smaller than the number of memory cards DM accommodated in the other direction by one. Therefore, in the memory cartridge B, the top plate in the portion where a smaller number of memory cards DM are accommodated is molded to become a top plate 22d lower by one stage. A space on the formed top plate 22d is used as a memory slot so as to accommodate the above-mentioned memory cards CM. Therefore, the memory cards DM accommodated in the main body 22 are exclusively used for recording data and the system control program is stored in the memory cards CM. As mentioned above, step difference is formed in the top plate of the memory cartridge B so that the memory cartridge B is unsymmetrical. Therefore, it is possible to prevent the memory cartridge B from being loaded in the data recording device a in a wrong direction. Also, the memory cards CM and the memory cards DM in which semiconductor memory elements are used as memory elements are commonly distributed. However, since it is possible to use memory cards in which hard disks are used as the memory elements, the subject of the present invention is not changed even any memory cards are used.

It is possible to take the memory cartridge B from the data recording device A by forming the memory cartridge B to be exclusively used for recording. The contents of the memory cards DM of the memory cartridge B having portability can be read by an editing device provided in another space and can be erased. On the other hand, since the memory cards CM can be taken out from and put in the multi-connector C1 as illustrated in FIG. 5, it is possible to take only the memory cards CM so that an updated and changed system control program can be recorded in the memory cards CM.

In order to realize the above aspect, to improve the manipulation and the convenience of use, and to secure the safety of the system, the memory cartridge B according to the present invention has the later-mentioned characteristic structure. First, since the memory cartridge B can be attached to and detached from the data recording device A, in particular, in order to facilitate the manipulation when the memory cartridge B is taken out from the data recording device A, a handle 23 is mounted in the main body 22 so that the memory cartridge B is taken out by gripping the handle 23.

The handle 23 includes pressure receiving portions 23c on both sides of the front end thereof and is U-shaped as illustrated in FIG. 8. A supporting roller 24 is provided in a supporting beam 23a in one direction so that the supporting beam 23a can proceed and recede in a guide groove 22b formed on the side of the main body 22. The handle 23 is elastically supported by the compression coil spring 25 to thus always protrude outside the main body 22.

Figure 9:
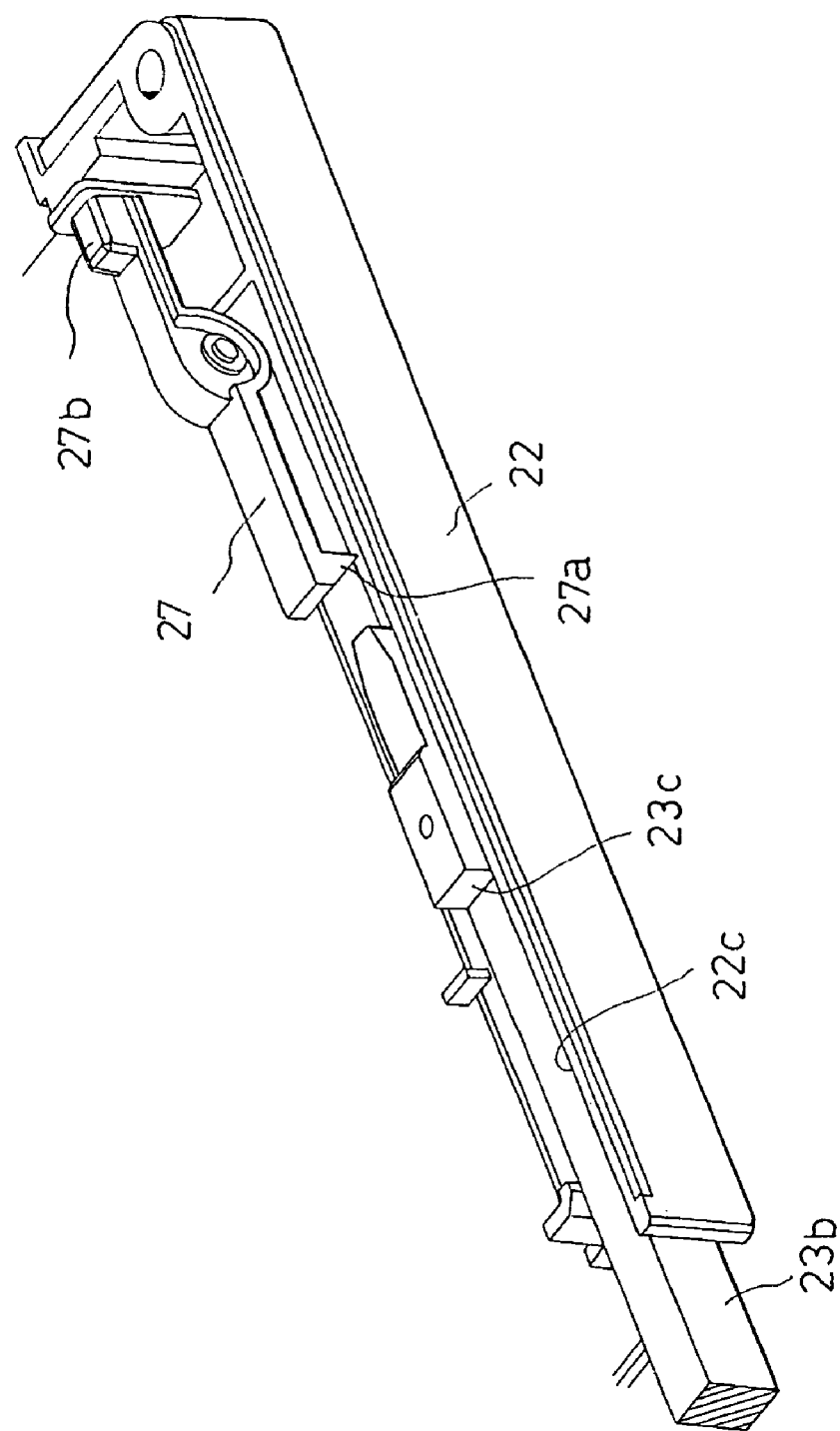
FIG. 9 is a view illustrating the operation of the handle of the memory cartridge.

On the other hand, a supporting beam 23b includes a supporting roller 26 to thus proceed and recede in a guide groove 22c formed on the side of the main body 22. As illustrated in FIG. 9, a protruding end 23c is formed in the leading end of the supporting beam 23b. A locking member 27 in which a hook 27a hooked to the protruding end 23c is formed is arranged inside the guide groove 22c. The hook 27a in the leading end of the locking member 27 is always elastically supported to thus fall in the guide groove 22c. A pressure receiving end 27b that receives the pressure for fluctuating the locking member 27 is formed in the rear end of the locking member 27.

Figure 10:
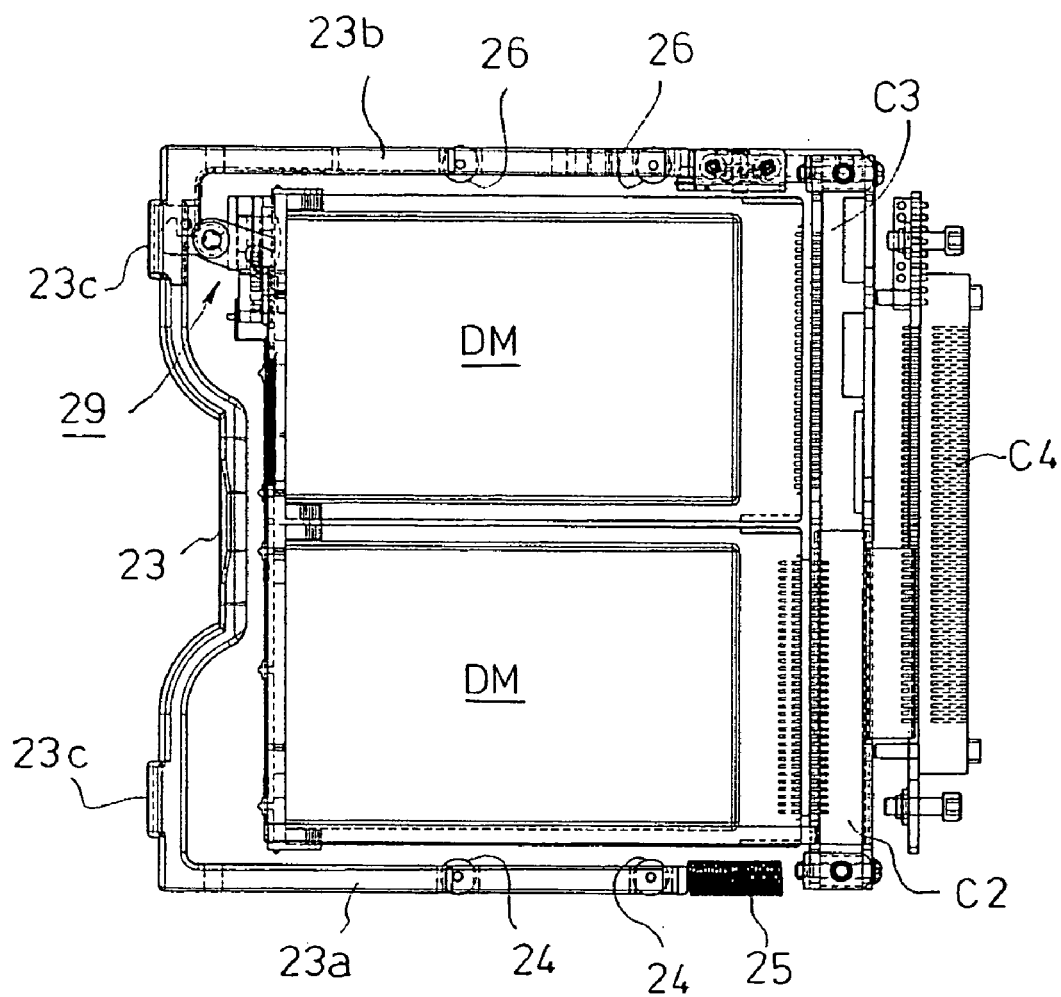
FIG. 10 is a view illustrating a state in which the handle operates.

Since the supporting beam 23b has the above-mentioned structure, when the handle 23 proceeds in the state of FIG. 8, since the protruding end 23c is hooked to the hook 27a of the locking member 27, as illustrated in FIG. 10, it is possible to accommodate the handle 23 in the main body 22 and to thus fix the handle 23 to the main body 22. Also, when the memory cartridge B is loaded in the data recording device A, a pressing pin 28 (refer to FIG. 6) suspended from the top plate of the memory cartridge holder 5 in the position where the memory cartridge B is loaded in the data recording device A presses the pressure receiving end 27b that contacts the top plate of the main body 22 as illustrated in FIG. 3. Therefore, The protruding end 23c is unlocked from the hook 27a. The detailed contents of such a function will now be described.

Next, an eject/lock mechanism 29 for accommodating the handle 23 in the main body 22 so that the handle 23 is fixed to the main body 22 and for popping out the handle 23 from the main body 22 will now be described.

The eject/lock mechanism 29 is provided on the side of the front end of the aperture of the memory cartridge B as illustrated in FIG. 3. The detailed structure thereof will be illustrated in FIG. 11. In FIG. 11, reference numeral 30 denotes a lock lever that is rotatably supported by a slide member 31 to thus swing so that a hook 30b in the leading end of the lock lever 30 swing about a supporting point 30a in accordance with the reciprocating motion of the slide member 31. The slide member 31 is elastically supported by the tension coil spring 32 having tension weaker than the tension of the tension coil spring 25 of the above-mentioned supporting beam 23a to thus maintain the lock lever 30 in the right position. A magnetic body 33 is fixed to the slide member 31. A solenoid 34 for sucking the magnetism of the magnetic body 33 by a yoke 34a is fixed to the main body 22. The magnetism sucking force of the solenoid 34 is set to be stronger than the tension of the compression coil spring 25.

Since the eject/lock mechanism 29 has the above structure, when the memory cartridge B is loaded in the data recording device A, the locking of the handle 23 is performed by hooking a lock pin 35 included in the handle to the hook 30b of the lock lever 30. When the handle 23 is accommodated in the main body 22 so that the handle 23 is fixed to the main body 22 in a state where the memory cartridge B is taken out from the data recording device A so that the memory cartridge B becomes a single body, as mentioned above, the locking of the handle 23 is performed by hooking the protruding end 23c of the supporting beam 23b to the hook 27a of the locking member 27 to thus improve the portability of the memory cartridge B.

Figure 12:
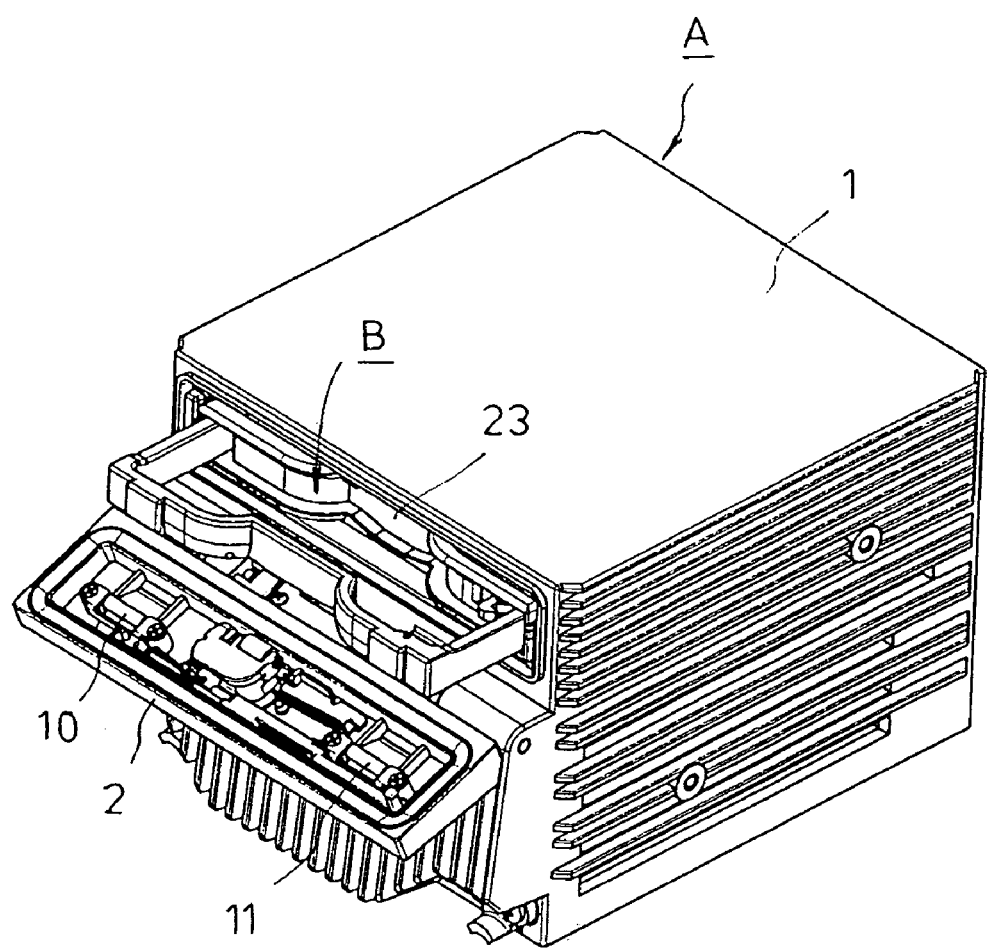
FIG. 12 is a perspective view illustrating a state in which the memory cartridge is loaded.

Next, the operation state of the eject/lock mechanism 29 when the memory cartridge B is loaded in the data recording device A will now be described. When the memory cartridge B is loaded in the data recording device A, as illustrated in FIG. 12, the handle 23 is popped out. According to the state illustrated in FIG. 12, since the main body 22 of the memory cartridge B is in the position where the memory cartridge B is loaded and stopped, as mentioned above, the pressing pin 28 suspended from the top plate of the memory cartridge holder 5 presses the pressure receiving end 27b of the locking member 27 and the protruding end 23c is unhooked from the hook 27a so that the handle 23 is popped out by the operation of the compression coil spring 25.

Figure 13:
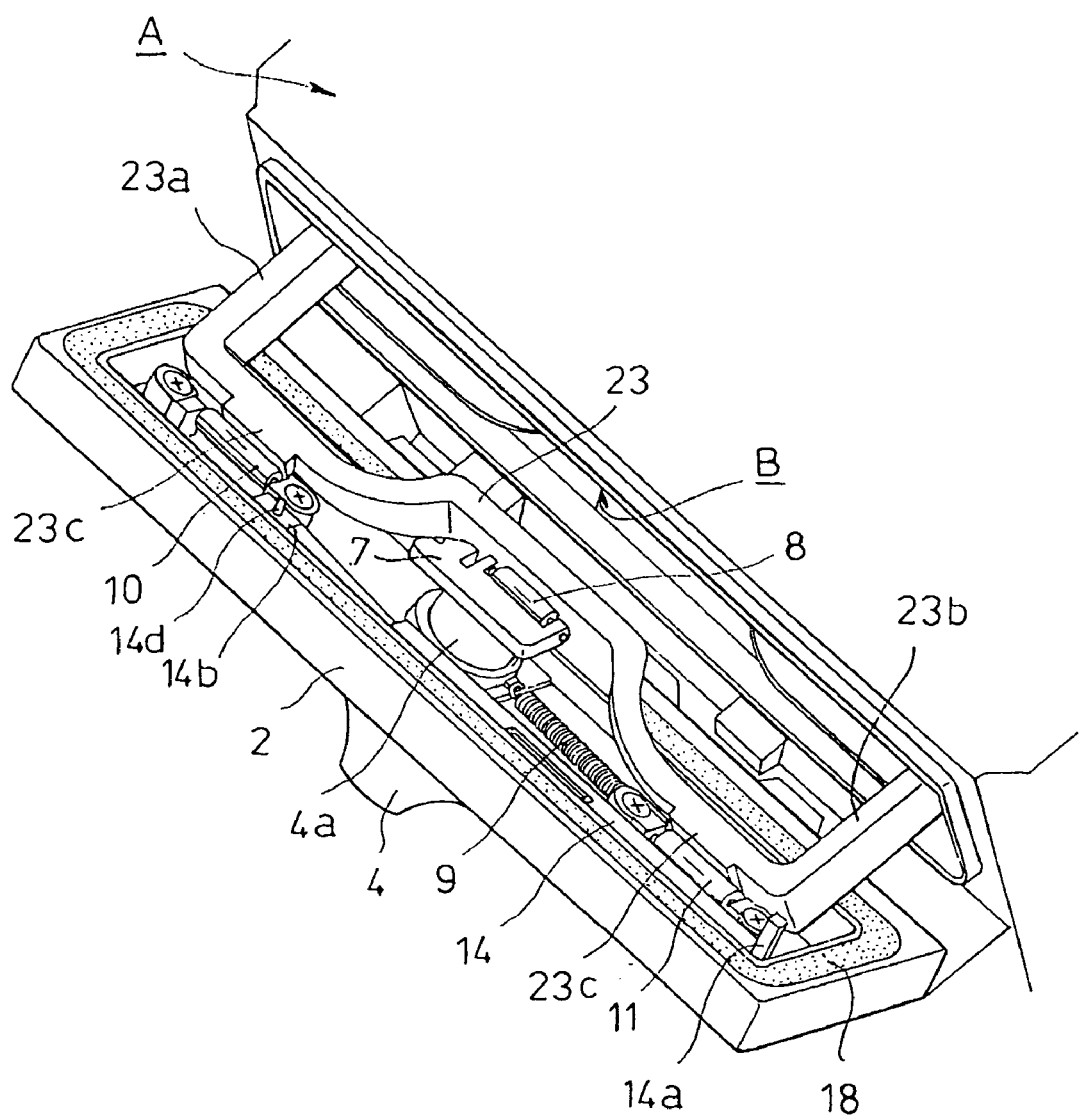
FIG. 13 is a perspective view illustrating a state in which the open-close door operates.

When the open-close door 2 is rotated in the latching direction in this state, as illustrated in FIG. 13, the pressing roller 8 of the latch plate 7 presses the center of the handle 23 so that the handle 23 begins to recede. When the recession of the handle 23 proceeds, the pressure receiving portions 23c on both sides of the front end of the handle 23 are pressed by the pressing rollers 10 and 11 arranged on both sides of the other side of the open-close door 2. When the handle 23 reaches the position in which the open-close door 2 is completely latched, the multi-connector C4 in the rear end of the memory cartridge B is connected to the multi-connector of the data recording device A by the final pressure of the pressing rollers 10 and 11.

At this time, the pressing roller 8 of the latch plate 7 is disconnected from the end of the handle 23. At the same time, the manipulation end 14a of the seesaw lever 14 swings in a state of being connected to the side wall of the main body 1 so that the door knob 4 is rotatable. On the other hand, the pressing pin 14d in the leading end of the swung seesaw lever 14 presses the rear end of the memory cards CM loaded in the top plate of the memory cartridge holder 5 to thus prevent the memory cards CM from being detached from the multi-connector C1. In this state, since the pressing rollers 10 and 11 are elastically supported by the plate springs 12 and 13, the memory cartridge B is always pressed in the loading direction to thus firmly connect the memory cards DM to the multi-connectors C2 and C3. By doing so, when the handle 23 is completely accommodated in the main body 1, the lock pin 35 of the handle 23 is hooked to the hook 30b of the lock lever 30.

In this state, when the door knob 4 is rotated, the latch plate 7 is latched as illustrated in FIG. 7 so that the latch operation of the open-close door 2 is completed. At this time, since the switch lever 20 provided in the top plate of the memory cartridge holder 5 swings, a switch operates in the rear end 20c thereof. When it is sensed that the memory cartridge B is loaded by the electric signal, the solenoid 34 starts to be supplied with electricity so that the locking state is maintained by the eject/lock mechanism 29.

Then, the operation state when the memory cartridge B is taken out from the data recording device A will now be described. As mentioned above, according to the present invention, since the semiconductor memory elements are used as the data recording media, a computer is mounted in the main body of the data recording device A so that data is recorded by the computer control. Therefore, when the memory cartridge B is taken out from the data recording device A, it is necessary to completely shut down the electronic circuits such as the computer in the main body 1. If the memory cartridge B is taken out during the operation of the electronic circuits such as the computer, the data stored in the memory cartridge B may be damaged. Therefore, according to the present invention, the following safety measures are taken.

Figure 14:
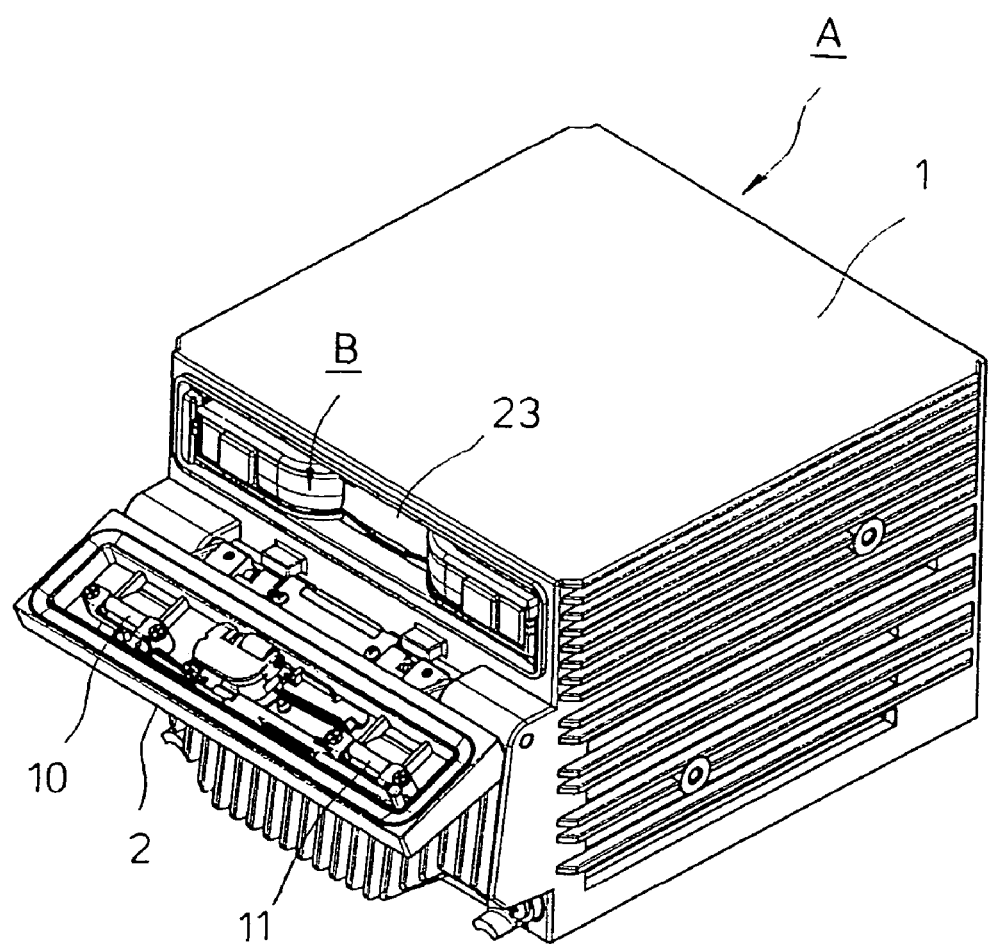
FIG. 14 is a perspective view illustrating a state in which the handle is locked.

That is, the handle 23 is not popped out, as illustrated in FIG. 14, from right after the open-close door 2 is opened in order to take the memory cartridge B from the data recording device A to until the electronic circuits are shut down. When the door knob 4 is rotated in order to open the open-close door 2, the switch lever 20 is returned to the original position. Then, the switch operates again in the rear end 20c thereof and the electric signal for sensing the open-close door 2 is opened is transmitted. Therefore, the electronic circuits start to be shut down. However, at this point of time, the solenoid 34 of the memory cartridge B remains supplied with electricity so that the locking state is maintained by the eject/lock mechanism and the handle 23 is not popped out even if the open-close door 2 is opened.

When the electronic circuits are completely shut down, the flow of electricity to the solenoid 34 is intercepted so that the sucking force of the slide member 31 is reduced by the magnetic force of the yoke 34a. At the same time, the compression coil spring 25 that elastically supports the supporting beam 23a of the handle 23 operates and the handle 23 is popped out as illustrated in FIG. 12 so that the memory cartridge B can be taken out by gripping the handle 23.

By doing so, the memory cartridge B taken out from the data recording device A set in an airplane can be carried as a single body by accommodating the handle 23 in the main body 22. Also, it is possible to download the data recorded in the memory cartridge B by the data recording device A provided in another place or an exclusively used recording and reproducing device and keep the downloaded data and to reuse the memory cartridge B by erasing the record of the memory cartridge B.

Figure 15:
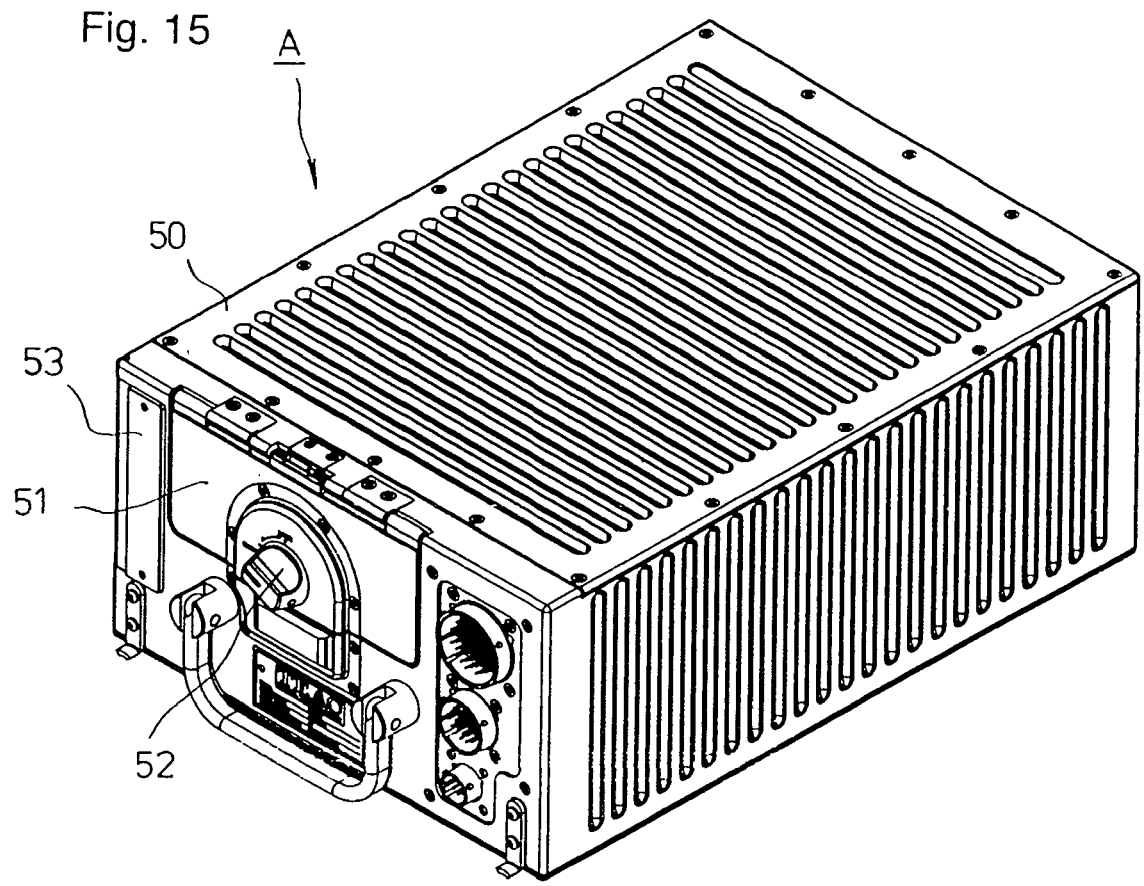
FIG. 15 is a perspective view illustrating the external appearance of a data recording device according to another example of the present invention.
Figure 16:
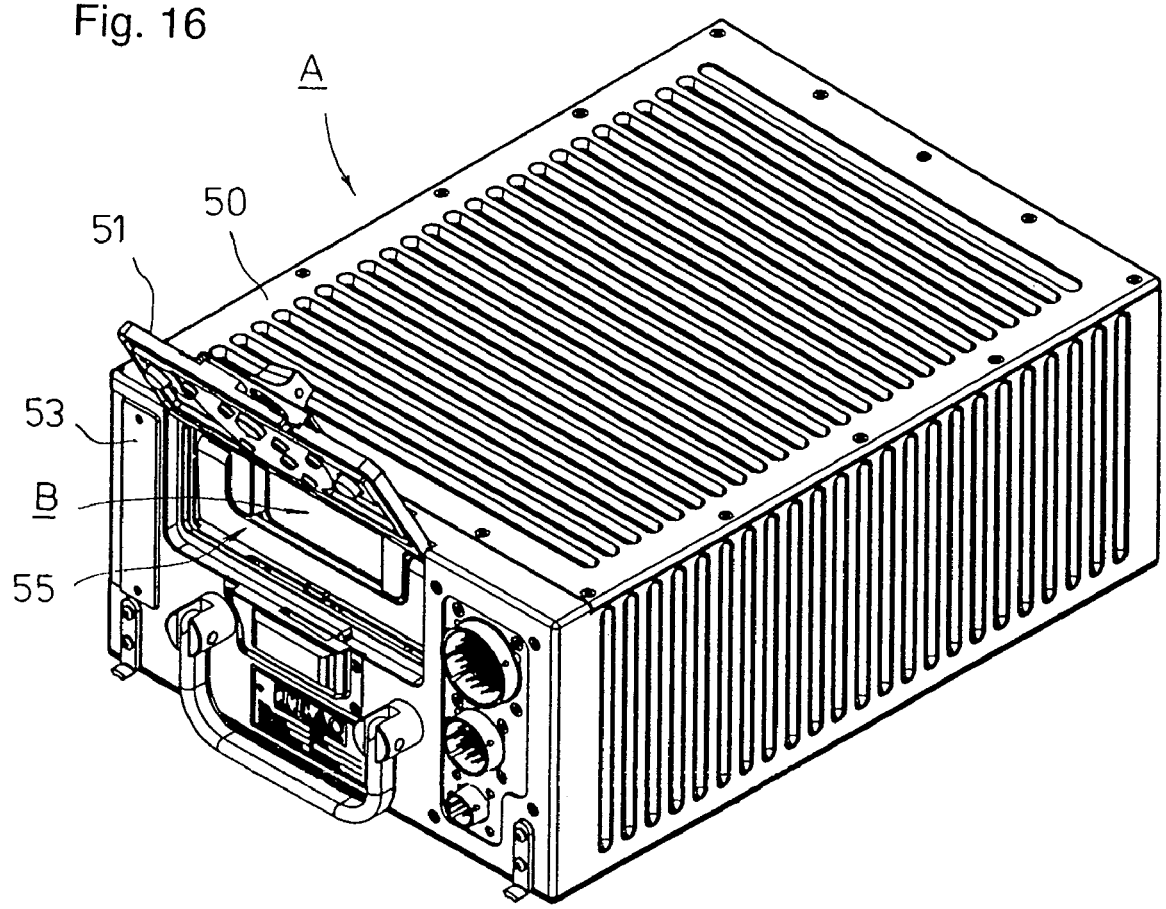
FIG. 16 is a perspective view illustrating the external appearance in which a state where the data recording device of FIG. 15 is used.

FIGS. 15 to 25 illustrate examples of other structures of the present invention, in which the number of memory cards accommodated in the memory cartridge is increased to thus cope with a case in which the memory cartridge holder is large. FIG. 15 illustrates the data recording device A completed to meet such a request. An open-close door 51 in which a door knob 52 is provided in the upper portion of the front surface and a side slot sealing cover 53 are provided in the main body 50 of a heat radiation structure. FIG. 16 illustrates a state in which the open-close door 51 is opened.

Figure 17:
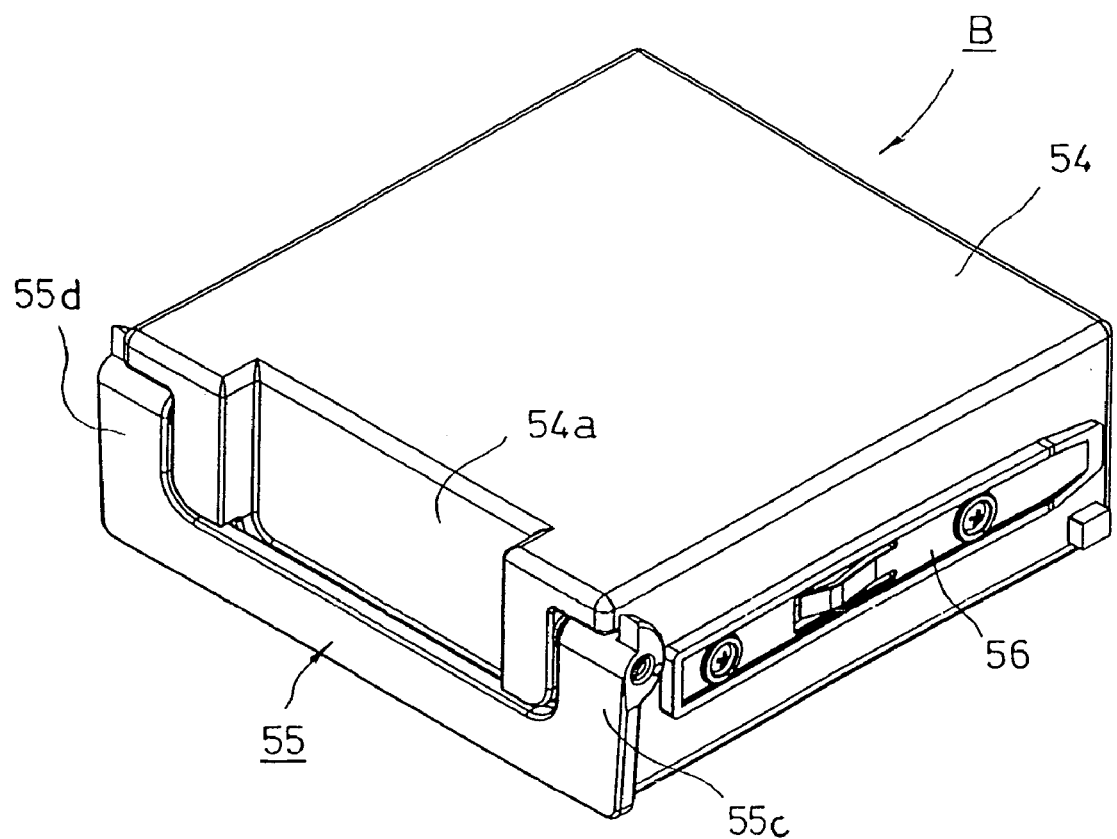
FIG. 17 is a perspective view of the memory cartridge of the data recording device of FIG. 15.

Next, the memory cartridge B for loading the data recording device A in the main body 50 includes the external appearance illustrated in FIG. 17. A case-shaped main body 54 is sealed and has its inside hollow in order to accommodate a plurality of memory cards using semiconductor memory elements as data reading media. Like in the above-mentioned embodiment, the accommodated memory cards are connected to the multi-connectors so that the memory cards can be connected to the data recording device A.

Figure 18:
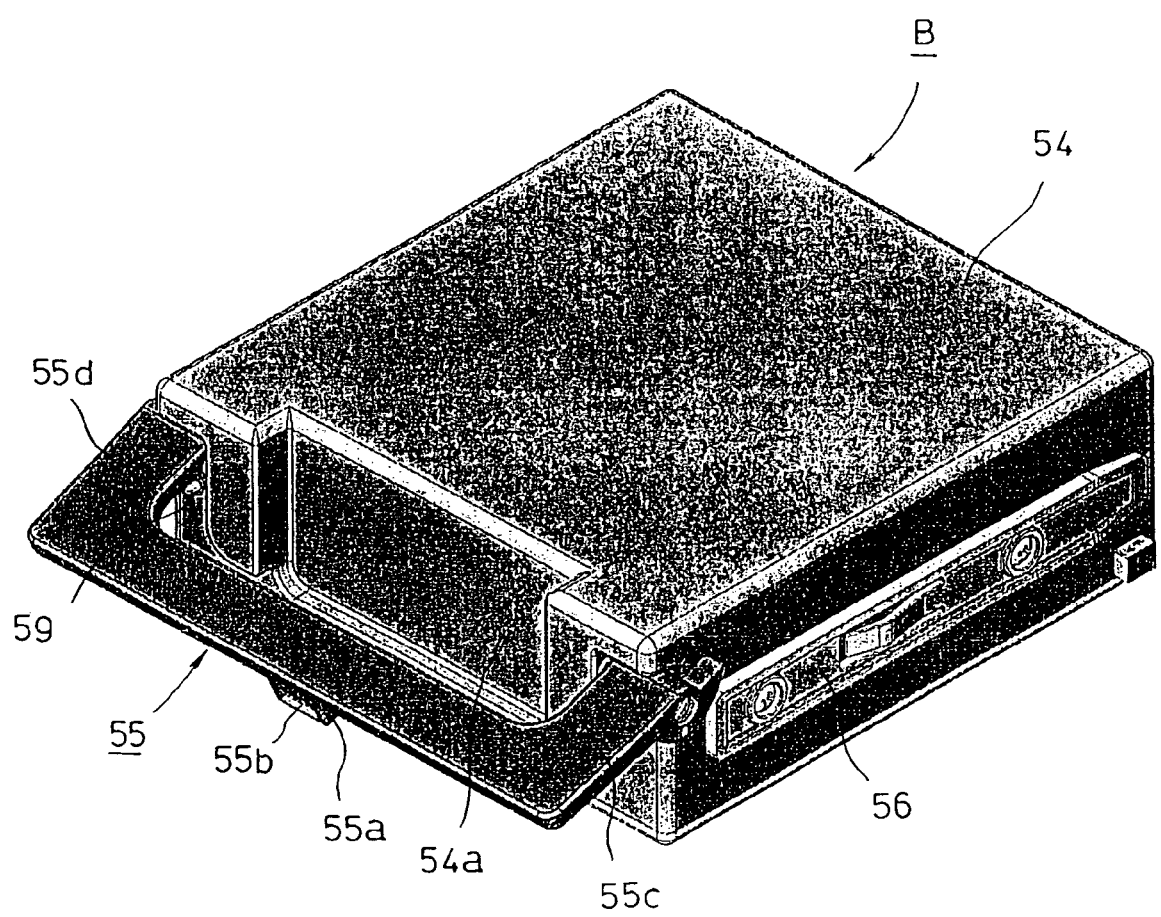
FIG. 18 is a perspective view of the structure of the memory cartridge of FIG. 17.

A concave portion 54a for allowing the fingers of a operator to be positioned is formed in the front surface of the main body 54 of the cartridge B. A handle 55 whose grip is positioned in the concave portion 54a is provided. As illustrated in FIG. 18, a piece 55a having a locking concave portion 55b is integrated with the central lower end of the grip of the handle 55. Cranks 55c and 55d of the handle 55 formed as mentioned above are mounted in the main body 54 so as to freely rotate by a pivoting pin. Also, a slide 56 is mounted on both sides of the main body 55 so that the main body 55 can be easily loaded in the main body 50.

Figure 19:
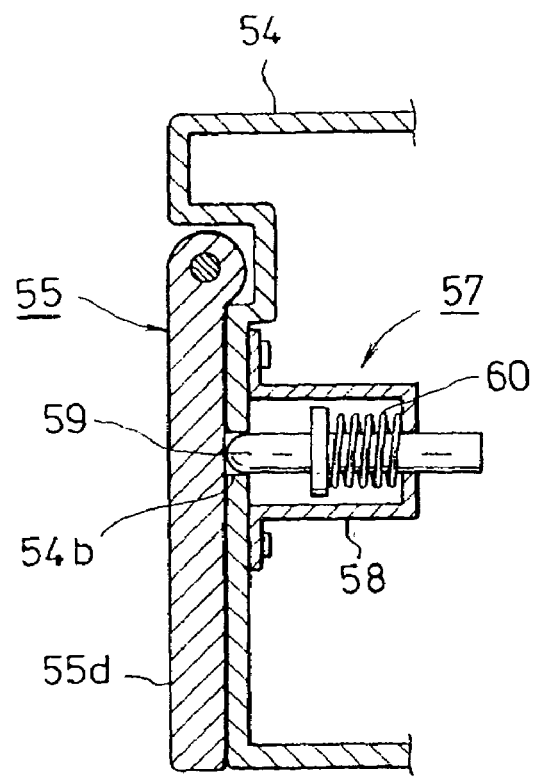
FIG. 19 is a sectional view illustrating an example of the structure of popping out of a handle.
Figure 20:
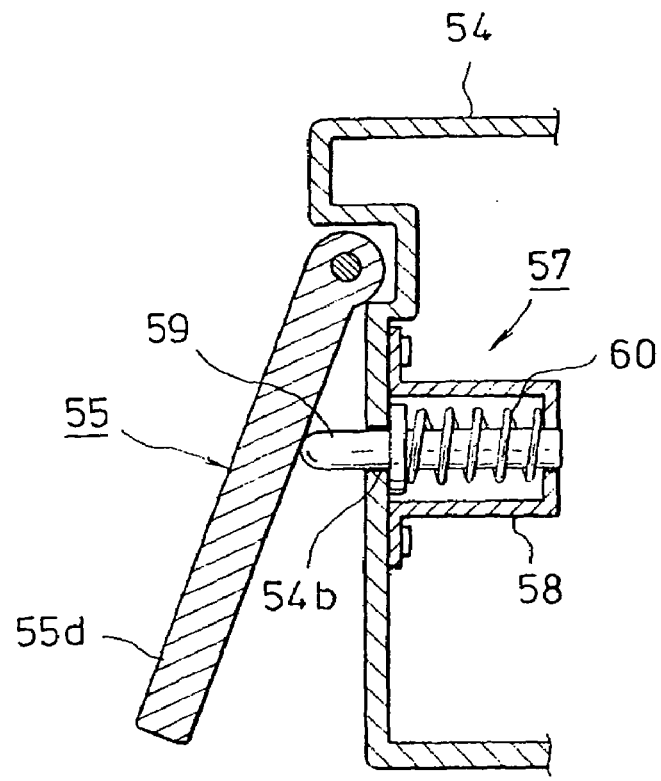
FIG. 20 is a sectional view illustrating a state in which the handle is popped out.

An elastic supporting mechanism 57 for the handle 55 is provided in the front surface of the main body 54 that is in the rear surface of the crank 55d of the handle 55 as illustrated in FIGS. 19 and 20. The rear end of the elastic supporting mechanism 57 is supported to a holder 58. The front end of the elastic supporting mechanism 57 elastically supports a rod pin 59 supported by the through hole portion 54b in the front surface of the main body 54 by a compression coil spring 60. As mentioned later, when a restriction state in which the handle 55 is integrated with the main body 54 of the memory cartridge is cancelled, the rod pin 59 jumps out from the through hole 54b due to the elastic supporting force of the compression coil spring 60. As a result, as illustrated in FIG. 20, the handle 55 is popped out.

Figure 21:
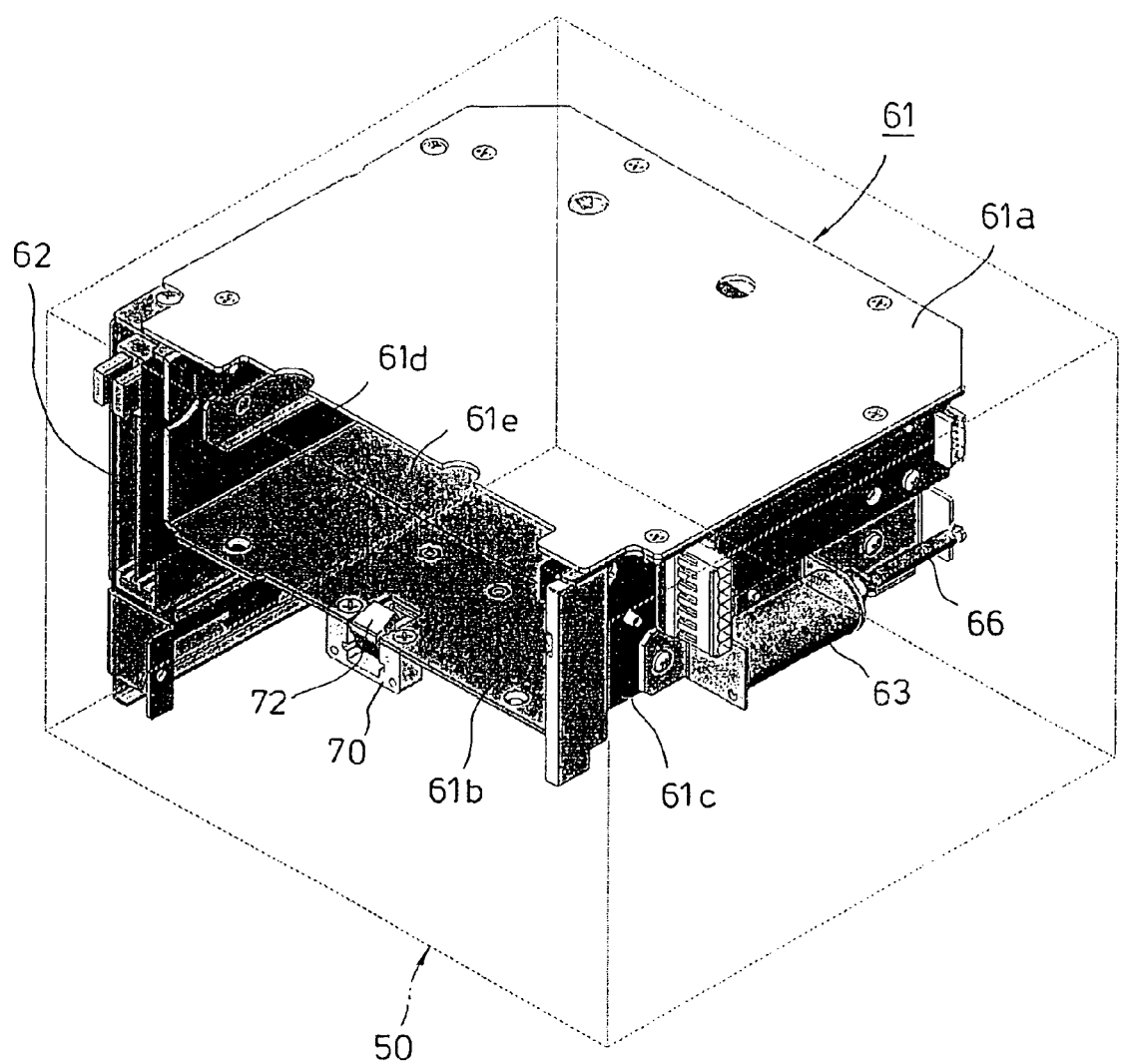
FIG. 21 is a perspective view illustrating the structure of a memory cartridge holder.

In order to accommodate the memory cartridge B having the above structure, a memory cartridge holder 61 formed on the rear side of the open-close door 51 of the main body 50 of the data recording device A is, as illustrated in FIG. 21, a box-shaped body in which an accommodating space surrounded by a top plate 61a, a bottom plate 61b, and a side plate 61c is formed. In the front surface of the memory cartridge holder 61, an aperture 61e is formed. On the side of the side plate 61d, a side slot 62 for loading memory cards for controlling a system is provided.

Figure 22:
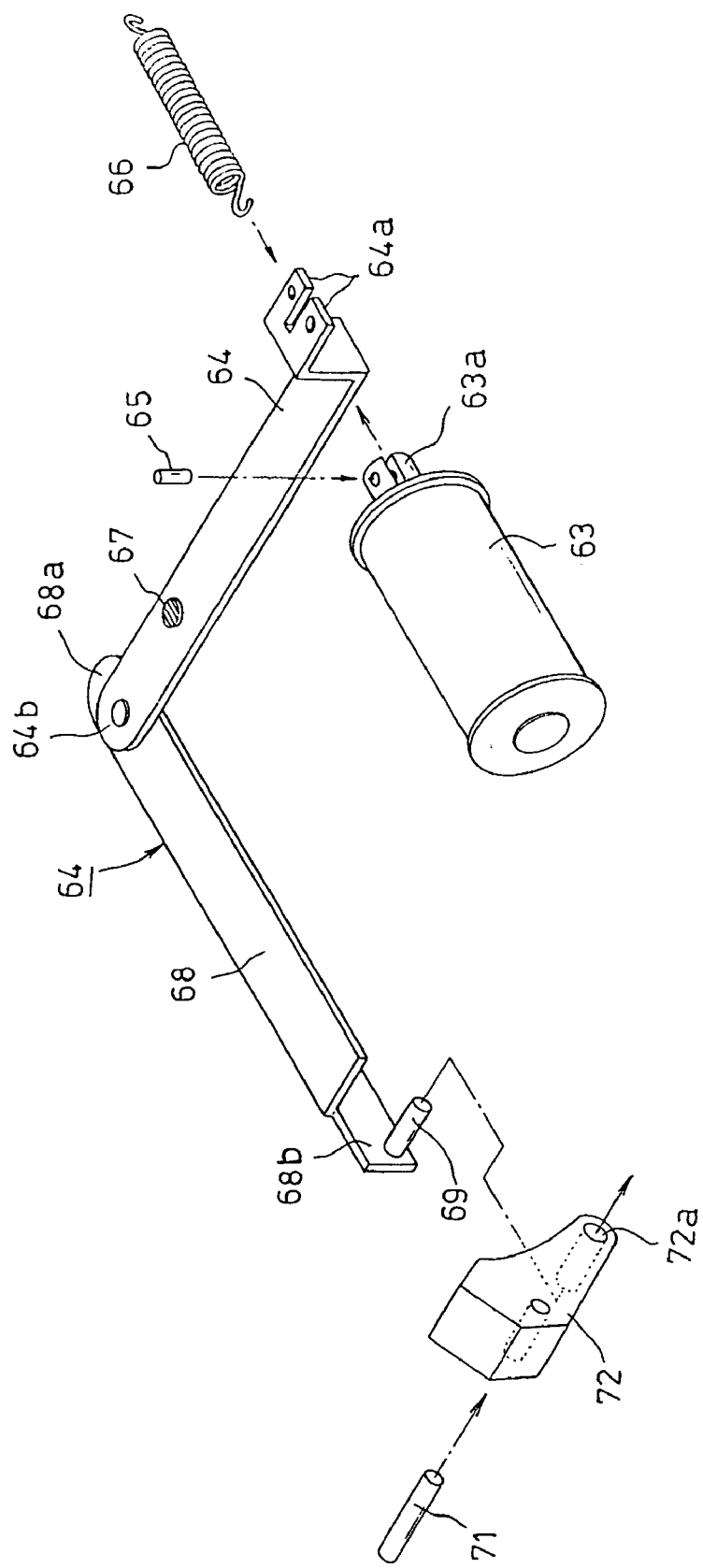
FIG. 22 is an exploded perspective view of a lock/unlock mechanism.

On the other hand, an electromagnetic solenoid 63 is fixed to the side of the side plate 61c. On the other side of the bottom plate 61b, a lock/unlock mechanism 64 of the handle 55, which is operated by the electromagnetic solenoid 63, is provided. As illustrated in FIG. 22, the lock/unlock mechanism 64 is formed so that a rod 63a of the electromagnetic solenoid 63 is connected to an end 64a of the lever arm 64 by a pin 65, that the end 64a is connected to a tension coil spring 66, and that the lever arm 64 swings about a pivoting pin 67 fixed to the bottom plate 61b.

Since the other end 64b of the lever arm 64 is connected to an end 68a of a link arm 68, the link arm 68 proceeds and recedes in accordance with the swing of the lever arm 64. A pivoting pin 69 fixed to the other end 68b of the link arm 68 is inserted into a through hole 72a of a latch block 72 pivotally supported by a pin 71 of a holder 70 fixed to the bottom plate 61b. Therefore, when the link arm 68 proceeds and recedes, the latch block 72 swings in accordance with the reciprocation of the link arm 68.

Figure 23:
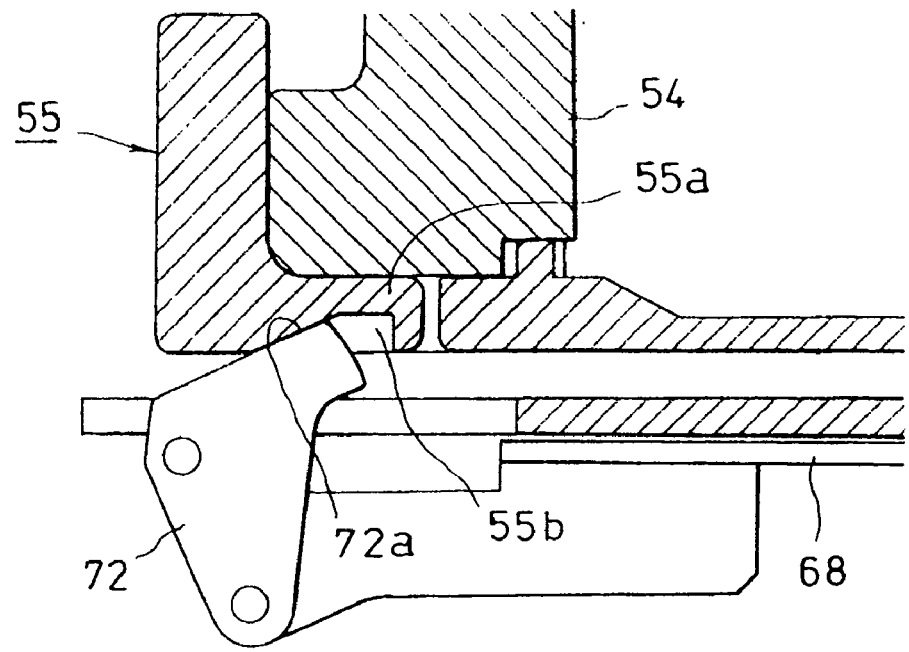
FIG. 23 is a sectional view illustrating a state in which the handle is locked.
Figure 24:
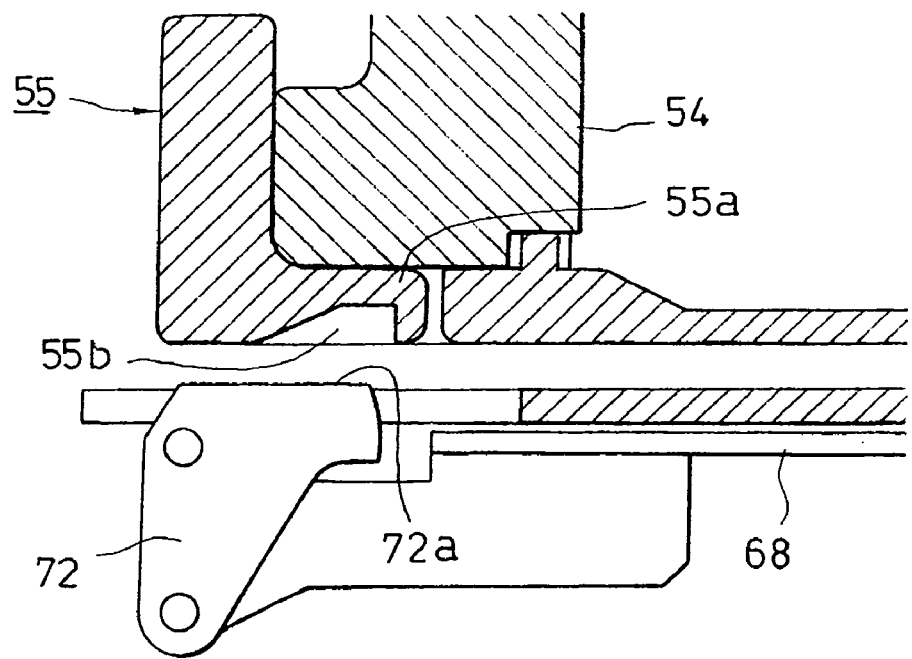
FIG. 24 is a sectional view illustrating a state in which the handle is unlocked.
Figure 25:
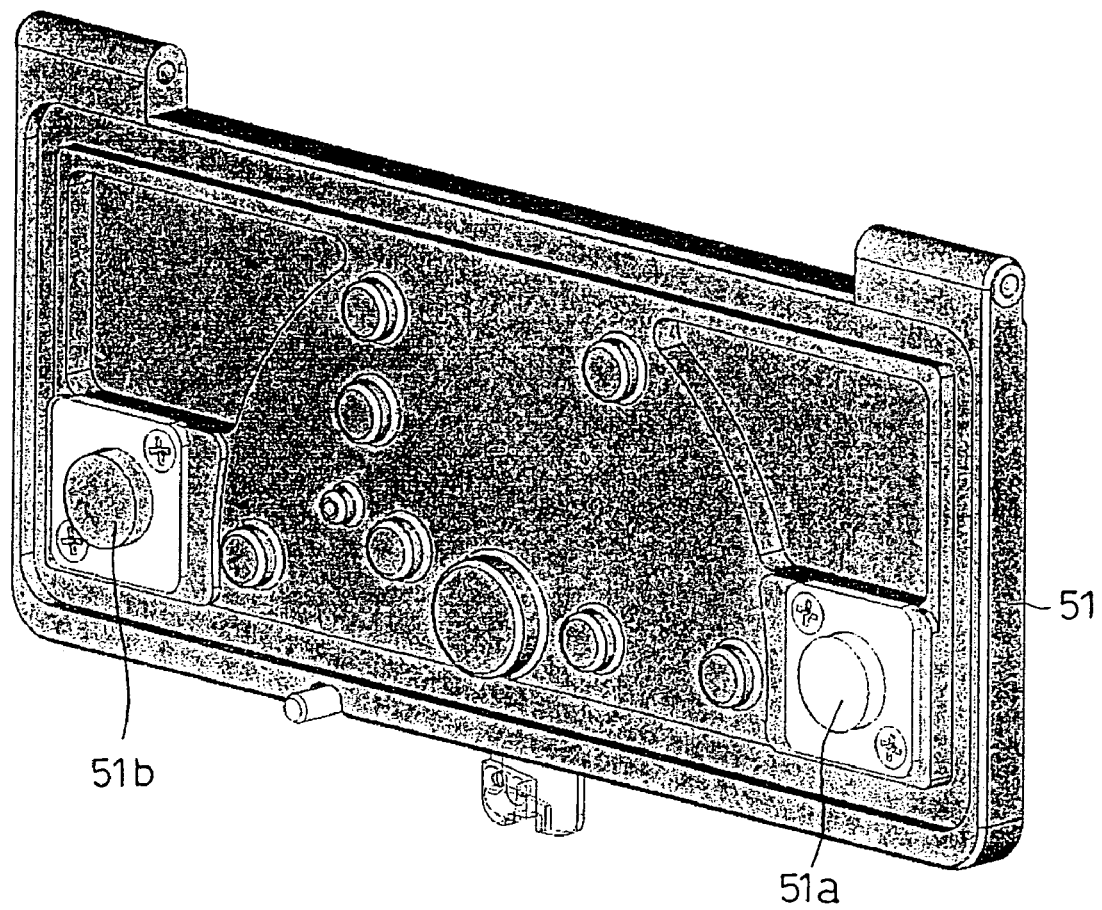
FIG. 25 is a perspective view illustrating the structure of a rear surface of the open-close door.

FIGS. 23 and 24 illustrate the operation states of the latch block 72. FIG. 23 illustrates a state in which the electro magnetic solenoid 63 is supplied with electricity. At this time, the lever arm 64 swings in a clockwise direction against the operation of the tension coil spring 66 in FIG. 22. The link arm 68 recedes so that the top side 72a of the latch block 72 is locked to the locking concave portion 55b of the piece 55a of the handle 55. Therefore, the handle 55 is fixed to the main body 54 so that the grip of the handle 55 cannot be gripped.

FIG. 24 illustrates a state in which the flow of electricity to the electromagnetic solenoid 63 is intercepted. The lever arm 64 swings in a counter-clockwise direction by the operation of the tension coil spring 66 in FIG. 22. The link arm 68 proceeds so that the latch block 72 swings. Therefore, the top side 72a is unlocked from the locking concave portion 55b of the piece 55a of the handle 55. In this state, since the rod pin 59 of the elastic supporting mechanism 57 jumps out, as illustrated in FIG. 20, the handle is popped so that the grip of the handle 55 can be gripped.

Then, a state in which the memory cartridge B is loaded in the data recording device A will now be described. As illustrated in FIG. 16, the open-close door 51 of the data recording device A is opened and the memory cartridge B is loaded with opening 61e of the memory cartridge holder 61, and the open-close door 51 is latched as illustrated in FIG. 15 and the door knob 52 is rotated to thus lock the open-close door 51, and thus elastic pressing members 51a and 51b provided in the rear surface of the open-close door 51 illustrated in FIG. 25 press the cranks 55c and 55d of the handle 55, simultaneously turning on the electricity to the electromagnetic solenoid 63 is started. Therefore, as illustrated in FIG. 23, the latch block 72 is locked to the locking concave portion 55b of the handle 55 so that the handle 55 is locked, so that the stableness of said loaded memory cartridge B is maintained.

When the loaded memory cartridge B is taken out from the data recording device A, the open-close door 51 is unlocked by the door knob 52 to thus open the open-close door as illustrated in FIG. 16. When the open-close door 51 is opened, the shut down of the electronic circuits starts based on the signal obtained by the switch means that moves after the open-close door 51. When the shut down of the electronic circuits is completed, the electromagnetic solenoid 63 operates due to the signal based on the shut down of the electronic circuit and the handle 55 is unlocked as illustrated in FIG. 24 so that the memory cartridge B can be taken out from the data recording device A by gripping the grip of the handle 55.

As mentioned above, according to one aspect of the claimed invention, the memory cartridge comprises a handle capable of being popped out, so that it is possible to easily eject memory cartridge from data recording device. According to another aspect of the claimed invention, since the popped-out handle is fixed to the main body of the memory cartridge, it is possible to improve portability thereof. According to still another aspect of the claimed invention, the memory cartridge comprises the eject/lock mechanism. Therefore, it is possible to pop out the handle by the control from the main body of the data recording device. According to yet another aspect of the claimed invention, the handle of the memory cartridge is popped out after completion of the shut-down of the main body of the data recording device. So thus, it is possible to protect data that is recorded in the memory card of the memory cartridge. According to further aspects of the claimed invention, it is possible to mount firmly the memory cartridge to the data recording device, and prevent separation or bad connection due to vibrations.

What is claimed is:

1. A replaceable memory cartridge of a data recording device accommodating a memory card as a data recording medium,
   wherein the memory cartridge comprises a handle and a compression coil spring, the compression coil spring being operative to pop the handle out from a main body of the data recording device, and
   wherein the memory cartridge further comprises an eject/lock mechanism capable of electrically controlling the popping out of the handle from the main body of the data recording device.

2. The memory cartridge according to claim 1,
   wherein, in a state where the memory cartridge is taken out from the data recording device to thus be a single body, the handle can be accommodated in and fixed to the main body of the memory cartridge.

3. A data recording device equipped with a replaceable memory cartridge accommodating a memory card as a data recording medium,
   wherein the memory cartridge comprises a handle and a compression coil spring, the compression coil spring being operative to pop the handle out from a main body of the data recording device, and an eject/lock mechanism capable of electrically controlling the popping out of the handle from the main body of data recording device, and
   wherein the handle of the memory cartridge is electrically controlled to pop out from the main body of data recording device by releasing a locking state of the eject/lock mechanism by synchronizing with shut-down completion of the data recording device.

4. A data recording device equipped with a replaceable memory cartridge accommodating a memory card as a data recording medium,
   wherein the memory cartridge comprises a handle capable of being popped out,
   wherein the data recording device comprises a memory cartridge accommodating portion, an open-close door provided in the memory cartridge accommodating portion, and a pressing member provided in the open-close door, and
   wherein the pressing member is operative to press the handle of the memory cartridge to hold the memory cartridge within the memory cartridge accommodating portion of the device.

5. The data recording device according to claim 4,
   wherein the pressing member is equipped with a rotatable pressing roller, and
   when the open-close door is closed, the memory cartridge is pressed by spring pressure of pressing roller in a loaded direction.

* * * * *